United States Patent [19]
Perrin

[11] Patent Number: 5,506,949
[45] Date of Patent: Apr. 9, 1996

[54] METHOD FOR THE CREATION OF ANIMATED GRAPHICS

[75] Inventor: Raymond Perrin, 6, Avenue des Roses, 95230 Soisy Sous Montmorency, France

[73] Assignees: Raymond Perrin, Montmorency; Isabelle Cuadros, Montreuil, both of France

[21] Appl. No.: 110,431

[22] Filed: Aug. 23, 1993

[30] Foreign Application Priority Data

Aug. 26, 1992 [FR] France .................................. 92 10297

[51] Int. Cl.$^6$ ............................ G06T 13/00; G06T 15/70
[52] U.S. Cl. ............................................ 395/152; 395/136
[58] Field of Search ........................... 395/152, 136–138, 395/118, 141–143; 352/87, 50; 345/121–122

[56] References Cited

U.S. PATENT DOCUMENTS

| | | | |
|---|---|---|---|
| 4,600,919 | 7/1986 | Stern | 340/725 |
| 4,952,051 | 8/1990 | Lovell et al. | 352/87 |
| 5,214,758 | 5/1993 | Ohba et al. | 395/164 |
| 5,261,041 | 11/1993 | Susman | 395/152 |

FOREIGN PATENT DOCUMENTS 2245807  1/1992  United Kingdom.

OTHER PUBLICATIONS

Girard, "Interactive Design of 3D Computer Animated Legged Animal Motion" IEEE CG&A, Jun. 1987, pp. 39–51.

Wilhelms, J. "Using Dynamic Analysis for Realistic Animation of Articulated Bodies" IEEE CG&A, Jun. 87, pp. 12–23.

Wilhelms, J. "Toward Automatic Motion Control" IEEE CG&A, Apr. 1987, pp. 11–22.

Armstrong, W. et al., "Near Real Time Control of Human Figure Models" IEEE CG&A, Jun. 1987 pp. 52–61.

N. Badler et al., *Articulated Figure Positioning by Multple Constraints*, I.E.E.E. Computer Graphics and Applications, vol. 7, No. 6, Jun. 1987, New York, NY, pp. 28–38.

*Primary Examiner*—Heather R. Herndon
*Assistant Examiner*—Joseph H. Feild
*Attorney, Agent, or Firm*—Nilles & Nilles

[57] ABSTRACT

To create animated graphics, a first key position of a character is taken into a first setting and then a second key position of this character is taken into the same setting in keeping one and the same securing pivot for both key positions. For the second key position of the character, a second pivot is determined. The position of this second pivot in the first setting is measured for the first and then the second posture of the character. The position where the character is supposed to take support by the second pivot is defined by the intersection of the trajectory of this second pivot with a reference plane of the setting. It is shown that acting in this way prevents the slipping effects that are obtained, when no precautions are taken, with automatically animated pictures.

10 Claims, 4 Drawing Sheets

METHOD FOR THE CREATION OF ANIMATED GRAPHICS

BACKGROUND OF THE INVENTION

1. Field of the Invention

An object of the present invention is a method for the creation of animated graphics. It can be used in the cinema and television industries. In these industries, it is useful for the creation of animated graphics for entertainment as well as for professional purposes, for example for training. It is aimed at making the movements performed in pictures by characters and, more generally, by entities more agreeable to the eye and hence more natural. These characters or these entities move about in an environment that shall be called a setting. The setting itself may be animated, i.e. it may change its appearance from one picture to another. The invention is aimed particularly at resolving a problem that arises when the animated entities are made by an operator, called an animation artist or animator while the animated setting is made by another animator or even by the same animator at another time. Putting together these two pictures requires, so to speak, an operation of synchronization that is performed far more simply with the invention than can be done in the prior art. The invention also seeks to give the moving entities behavior that is fluid and not jerky. Finally, the invention has the effect of modifying the postures of the entities from one picture to another, if these postures are not in harmony with the changes of the setting in which they are moving.

The term "setting" shall refer to the set of structures constituting the environment in which a character or an entity is supposed to move. A setting may have several states or appearances. These states are, to put it in a simplified way, the impression that may be had of the setting from a given viewpoint with a given lighting and with a given depth and field width. In the same way, an entity, most frequently a character, could have postures that intrinsically represent different positions of this character in space. A scene is constituted by the association of the picture of a state of the setting (it will always be called a state) with the picture of an posture (hereinafter called a posture). It must be assumed, however, that the notions of setting and entity are reversible, it being possible for the one to replace the other.

In a particular implementation of a method such as this, a state is constituted by a set of (3D) volume elements that correspond or do not correspond to the presence of a structure (such as a tree, house etc.). In a memory of a computer system, it is possible to make memory cells correspond biuniquely with these volume elements, each of said memory cells being loaded with a binary information element (1 or 0) depending on whether or not this memory cell corresponds to the presence of a structure. The information may be different from binary information if the colors are to be depicted: in this case, it may comprise for example three information elements corresponding to red, green or blue for display in television mode. A state as well as a posture are constituted in the same way, by a set of memory cells loaded with information elements 1 or 0.

The assembling of the two pictures to constitute a scene amounts to replacing the information borne in the memory cells corresponding to the setting by an information element corresponding to the entity. Quite simply, when, for the picture of a posture, a memory cell loaded with a zero information element is encountered (implying that there is no character present at this place), the value loaded in the corresponding memory cell of the state is kept. By contrast, as soon as the memory cell corresponding to the character has an information element, this information element is substituted for the information relating to a state. Cases of conflict may arise when, typically, it is sought to place a posture of the character in an impossible place: for example, inside a structure of the setting. It is therefore seen that there is an essential operation that consists, firstly, in securing or fixing the posture with respect to the state and, secondly, in replacing the information elements relating to state by information elements relating to posture.

2. Description of the Prior Art

Until now, despite the development of techniques, the creation of animated sequences has been rather a matter of piecemeal tinkering. It keeps the animators occupied for very lengthy periods of time. For example, it is known that a sequence of a one-minute scene comprising an entity moving in a setting requires work by two animators for one month. With the invention, a sequence such as this requires the work of only one animator for three days. If we look at the problem of the synchronization of the movements of entities in settings, it can even be estimated that the movement of an entity in a setting, for a one-minute sequence, requires fifteen days' work by an animator. With the invention, this problem of movement is resolved in one minute.

The invention relates to the field of 2D graphics as well as to that of 3D graphics. In both cases, the invention relates to animated graphics created with the aid of a computer. For 2D graphics, it can easily be seen that a picture can be represented by a set of picture elements or pixels arranged in matrix form, each carrying an information element on luminance and chrominance. Notably, with digitization, these information elements on luminance and chrominance can be stored in a picture memory of a computer. In correspondence with each pixel of a picture, there is an address of a memory cell of the memory and information elements have been loaded into this cell. It is thus possible to store a 2D picture of the entity as well as a 2D picture of the setting. With a picture of an entity and a picture of a setting, it is possible to constitute a picture of a scene by carrying the entity into the setting. Naturally, the work is done in the memory of the computer by manipulating the addresses and the contents of the concerned cells. If necessary, rather than carrying out a replacement, it is possible to make a composition of the pixels of the setting and of the pixels of the entity at the position of the entity to obtain effects of transparency. All these effects are of a known type.

In the same way, it is possible to define a 3D picture. The term "picture" is used on the understanding that what is represented is a phenomenon, either real or simulated, that occurs throughout the volume of space. To simplify the explanation, it can be assumed that a character will correspond, in space, to volume elements, called voxels, loaded with an information element 1 within the character and 0 outside the character. For all the voxels, it is possible to store an information element 0 and 1 in memory cells of a picture memory. Naturally, rather than having a limit of only one binary information element, it may be preferred, for 2D pictures, to have a more complex information element, notably an information element on chrominance. The setting is defined in the same way, and the scenes are constituted as above by the replacing, in the 3D picture of the setting, of the voxels of the setting by the voxels of the entity.

In another mode of implementation, the entities and the settings are described by a set, that is limited, of characteristic points. The collection of the memorized or stored information elements pertaining to these characteristic points replaces the memorizing or storage of all the points, voxels or pixels, of the scene to be constituted. A memorization or storage system such as this, called a vector system, is less demanding in terms of memorizing or storage capacity and is speedier in terms of image processing. This vector system is preferred from this viewpoint. The constitution of the scenes follows a same procedure as in the previous mode of implementation.

To show 3D pictures, use is made of known types of display methods that make it possible to obtain a rendition of the scene. These display methods, by their principle, simulate the subjecting of the scene to an illumination and simulate the observing of this scene, possibly with an effect of perspective, from a given viewpoint. There are many known techniques that enable this display, notably the so-called OCTREE techniques or again the so-called raycasting techniques. The invention is not concerned with these display techniques since, in 2D, the invention produces the picture to be displayed directly while, in 3D, the invention can be used to produce the scene which will itself be displayed by these techniques.

The constitution of animated sequences calls for the creation of several pictures. For example, for display in television mode, it is necessary to produce up to 25 pictures per second, giving about 1500 pictures for a one-minute sequence. Rather than having to draw each of these 1500 pictures, both for the setting and for each of the entities, when there are many entities, software programs are used, with a posture of an entity in a first key position at a first key date and a second posture of this entity at a second key date being known, to obtain intermediate postures by interpolation. It may be recalled that, in animation, it is not sought to obtain pictures of real motions but pictures of artificial motions. For example, there is a known software program called "SOFTIMAGE and CREATIVE ENVIRONMENT" by the firm SOFTIMAGE, Montreal, Quebec, Canada, in which a key positioning technique of this kind is implemented. This software furthermore makes use of a library of shapes, generally known as primitives, that are used together to constitute the entities (the characters) or the settings. A software program such as this therefore makes it possible to dispense with the creation of the numerous intermediate pictures needed between the key dates, and reduces the work of the animators accordingly.

To improve a method such as this, in the invention, it is sought firstly to synchronize the moving of the entities with respect to the setting. To attain this goal, the character must be placed accurately in the setting. The principle of the invention is then the following one. For a first scene constituted from a first state of the setting and from a first posture of the entity, a pivot position is identified: this is a place where physically the entity would rest (in the gravitational sense) or would take support on the setting. For example, a character walking, with one foot on the ground, enables a pivot to be obtained: the pivot is this foot. For the same setting, but for a following posture of the character (the next step), this foot of this character is made to take support at the same place of the setting. The other parts of the character then occupy positions, in the space of the scene, that are different from the positions of these same parts for the preceding posture. Then, a second pivot of the second posture of the character is determined. Then a comparison is made of the positions of this second pivot between the first posture and the second posture in the first state of the setting. Then, the place where this pivot should, in turn, take support on the setting is determined. Then the second scene, namely the subsequent scene, is constituted by making this second pivot take support, for the second posture, on this determined place in the setting. This method prevents an abnormal dislocation or lag of the motion of the setting with respect to the motion of the character.

As an improvement, to constitute sequences of intermediate pictures, the invention is not limited to a linear interpolation between positions of characteristic points of the characters. On the contrary, these motions are made more natural by modifying their trajectory. In particular, for a characteristic point of a character, the invention takes account not only of its position in each of the two key postures but also of the speeds at which these characteristic points shift in relation to preceding or following key pictures.

Finally, to make the motions more realistic, a special study is made of the trajectory of the center of gravity of the entity, and it is seen to it that, during all the intermediate pictures that are prepared, this center of gravity follows a curve that has the least possible unevenness. In this case, starting from a given posture and having to reach another given posture, a modification is made, for the intermediate pictures, with an inverted kinematic method, of the form of the posture in such a way as to dampen the shifts of this center of gravity.

SUMMARY OF THE INVENTION

An object of the invention, therefore, is a computer-assisted method for the creation of animated graphics wherein:

- at least one entity liable to be mobile, for example a character, is defined,
- there is constituted, in the memory of the computer, a sequence of at least two key pictures of this entity in which this entity takes up two postures, different from each other, associated with two key dates,
- a setting in which the entity is supposed to move is defined,
- there is constituted, in the memory of the computer, a sequence of at least two key pictures associated with at least two key dates of this setting, wherein this setting has two states,
- a sequence of scenes is made in the memory of the computer by the placing, for each scene of the sequence, of a picture of the entity in a picture of the setting;
- these scenes are shown by subjecting them to a process of display, wherein

- to make a first picture of a scene in a sequence, a first posture of the entity is taken into a first state of the setting by the identifying, for this first posture, of a first pivot of this entity and by the fixing of this first pivot to a first particular place on a first reference of this first state, and
- to make a second picture of a scene in the same sequence, a second posture of the entity is taken into a second state of the setting by the identifying, for this second posture, of a second pivot of this entity, and by the fixing of this second pivot to a second particular place in this second state,
- a measurement is made of the true position of this second pivot in the first scene as well as a simulated position of this second pivot in this first scene, this simulated position corresponding to the position obtained with the second posture, in fixing the first pivot to the first particular place of the first state, a second particular place is identified in the first scene by comparison of the true and simulated positions of this second pivot with a second reference of the first state, the second posture is taken into the second state in such a way as to make the second pivot coincide with the second particular place identified.

BRIEF DESCRIPTION OF THE DRAWINGS

The invention will be understood more clearly from the following description and from the accompanying figures which are given purely by way of an indication and in no way restrict the scope of the invention. Of these figures:

FIGS. 2a to 2c and 3a to 3c show schematic views of states of a setting and postures of an entity or character;

DETAILED DESCRIPTION OF THE INVENTION

Figure 1:
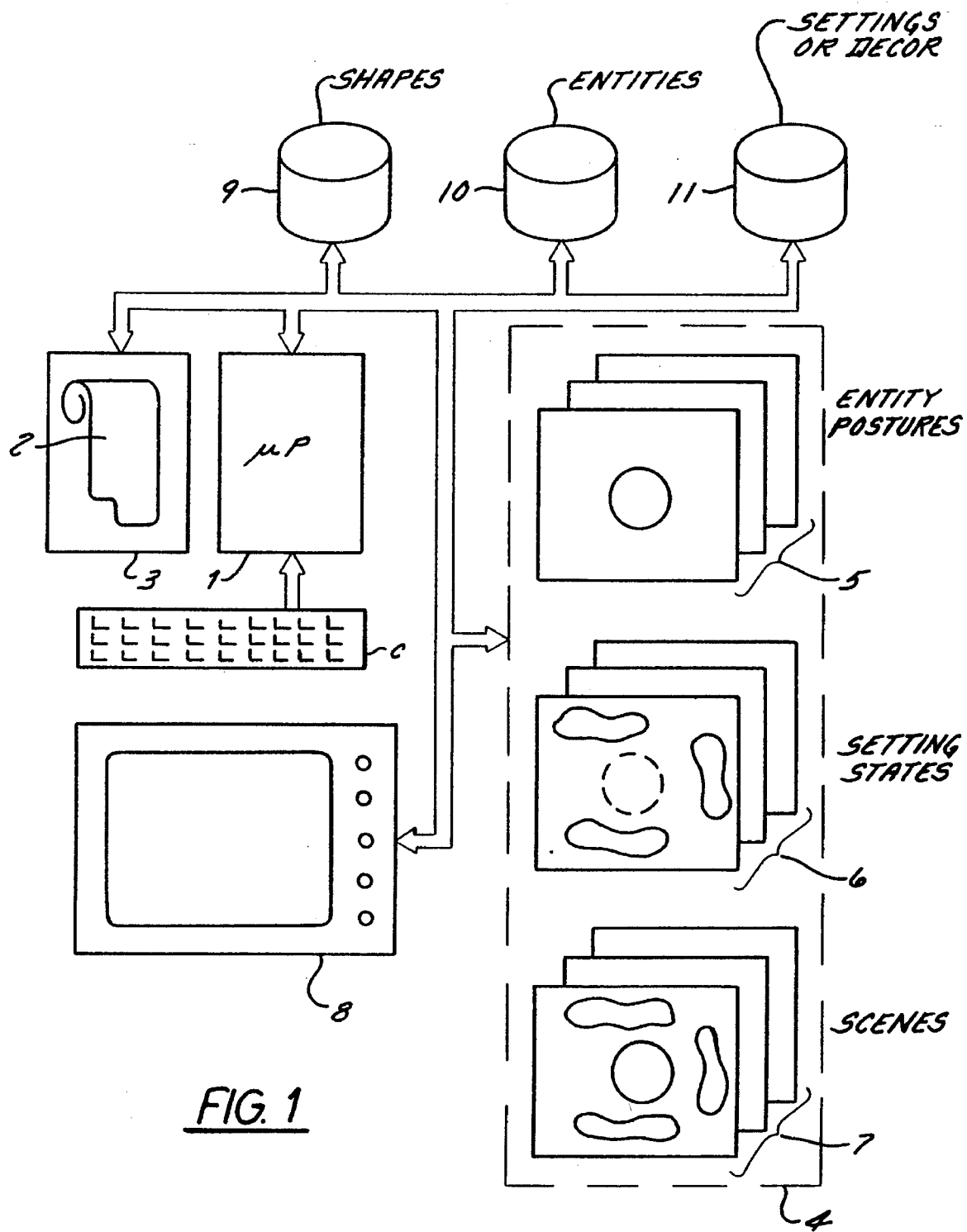
FIG. 1 shows a schematic view of the equipment needed to implement the invention.

FIG. 1 gives a schematic view of a device that can be used to implement the method of the invention. This device comprises a microprocessor 1 carrying out a program 2 contained in a program memory 3. The program 2 implements the simplifications of the invention. In a working memory 4, the system has a set 5 of memory pages to store entity postures, a set 6 of memory pages to store setting states and a set 7 of memory pages to store scenes. The system further comprises a device 8, represented symbolically herein by a display monitor, This device 8 is used to show the pictures of the scenes that have been prepared. In practice, these pictures of scenes may be either displayed directly on the monitor or lead to the creation, by known techniques, of a cinematographic film that could be viewed subsequently. The display may be deferred in time.

The constitution of the memory 4 does not necessarily take the form represented herein. The form it has been given herein is designed solely to provide for a clearer understanding of the invention. Notably, the working memory may, at a given time, contain only one scene or even a part of a scene, it being possible for postures of the entities and states of the setting to be prepared, in real time, from a library of shapes 9 containing primitives or polygonal shapes that can be used to construct 3D objects.

Among these primitives and shapes, it is possible to distinguish, conventionally, the primitives that are simple geometrical structures (cube, sphere, cylinder, tetrahedron etc.); shapes generated by revolution defined by a 2D generatrix curve and by an axis of revolution; prismatic shapes defined by a 2D generatrix curve and by a direction of projection; geodesic shapes constituted by several generatrix curves associated with one another and forming contour lines; mathematical shapes derived from mathematical functions; and finally free shapes constituted by surfaces for which all the elements are given point by point. A method of handling and using these primitives is, in particular, described in the software program referred to.

Using this library of shapes, it is possible to set up a library 10 of entities and a library 11 of settings. In the pages 5, 6 and 7, it is possible to store 3D pictures to be displayed or pictures that have already been subjected to a rendition effect. All these libraries and memory pages may be memorized or stored physically in a single memory of the system.

Figure 2A:
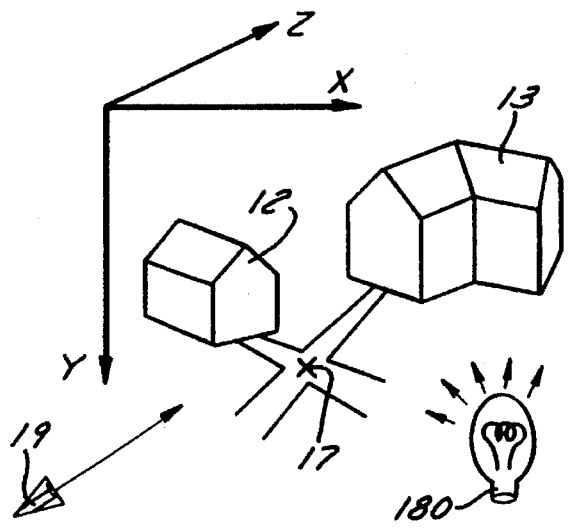
Figure 3A:
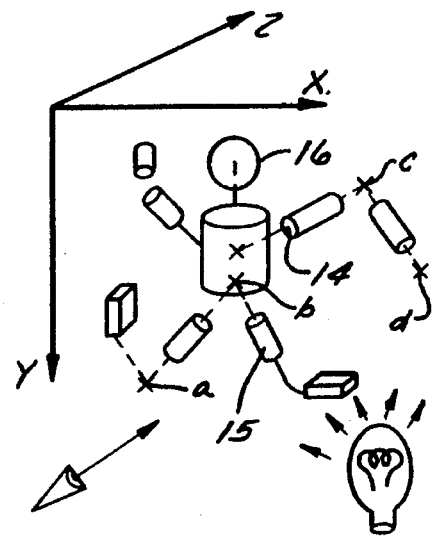

FIG. 2a shows a 3D view of the constitution, or layout and arrangement, of a setting. This setting has structures, for example houses 12 and 13, with all the details (not shown) needed to make them realistic. FIG. 3a gives a view, for the definition of an entity, of an assembly of shapes such as 14 to 16, capable together of constituting a character. These shapes are primitives, namely spheres, circular cylinders or rectangular parallelepipeds as indicated here above. The character is constituted essentially by a skeleton. Thus, the different shapes are articulated with respect to one another at certain places: for example, the characteristic points a, b, c, d of the character of FIG. 3a.

To constitute a scene, it is possible to place the character or, more generally, the entity at a particular place in the setting, for example at the position of the cross 17 (FIG. 2a). Once the character has been placed at the position of the cross 17, the contours of the setting corresponding to the location of this character are erased and replaced by those of the character. Since the scene is a 3D scene, to view it, namely to render it, it is necessary to illuminate it from one or more illuminating points such as 180, and it is necessary to observe it from the viewpoint 19. Seen from the viewpoint 19, the scene constituted by the assembling of the entity and of the setting may be converted into a purely 2D picture. If necessary, the rendition of the setting may be done in a certain way and the rendition of the character may be done in another way, notably as it regards the positioning of the illumination of the character which may be different from the positioning of the illumination of the setting. In principle, the viewpoint is likely to be the same one.

Figure 2B:
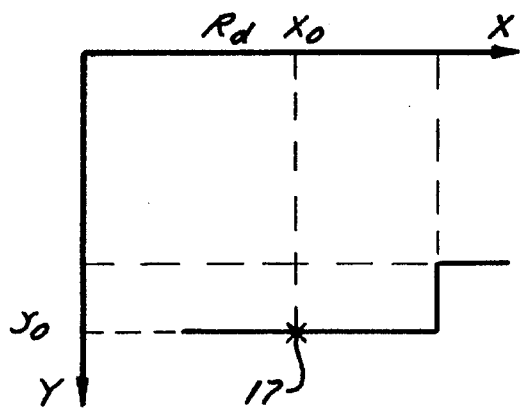
Figure 3B:
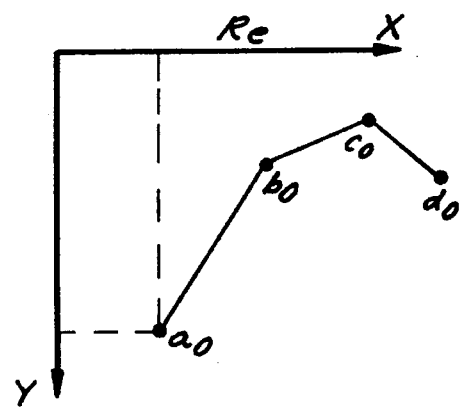
Figure 3A:
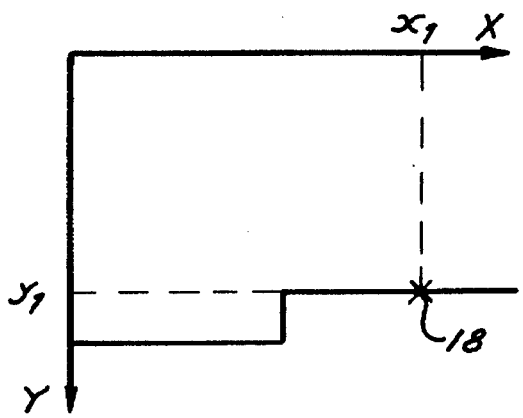

To simplify explanation, reference shall now be made to a 2D representation of the presence of the character in the setting. For example, the point 17, FIG. 2b, is placed at coordinates $X_0$ and $Y_0$ of the reference system Rd of the setting. In FIG. 3b, in the reference system Re which is proper to the character, (the character shown in FIG. 3b) or, more simply, the extremities a, b, c, d of its skeleton are placed in positions $a_0$, $b_0$, $c_0$ and $d_0$. What is known is that, for a second picture, shown in FIGS. 2c and 3c, some part of the character must find support some place in the setting. In the example shown, the character is falling and it is desirous for the character to be supported within the setting by an extremity of the character, such as its arm d (FIG. 3a). The problem resolved by the invention is that of finding the place 18, with coordinates $X_1$ $Y_1$ of the setting where it is necessary to make the extremity d of the character take support so that the impression of the moving of the character in the setting is a realistic one.

In the invention, FIGS. 4a to 4d, the method starts (FIG. 4a) with the positioning of a first pivot $a_0$ of the character at the position 17 of the setting. To obtain this result, it is necessary to shift the reference system $R_e$ of the character with respect to the reference system $R_d$ of the setting according to a vector $V_0$ which depends essentially on the position in which the animator has drawn the entity in the reference system of the entity. In practice, this is not a matter of great importance. He can draw the entity wherever he wishes, with a vector $V_0$ computed accordingly: adaptation is achieved automatically. This having been done, the first scene, from which the first picture to be seen is taken, has in fact been constituted in a standard way. To a vector such as $V_0$, there naturally correspond shifts of addresses of the cells of the memory. These shifts are computed automatically by the computer 1 as a function of actions carried out by an operator with a keyboard C with a mouse or peripheral used for acquisition. These address shifts pertain to the case of the picture memories. With respect to the preferred way of implementing the invention in a vector system, each vector representing a characteristic point undergoes a modification of its information corresponding to the vector $V_0$.

Figure 3C:
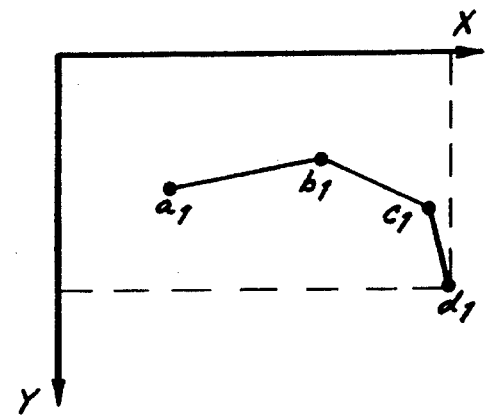
Figure 4A:
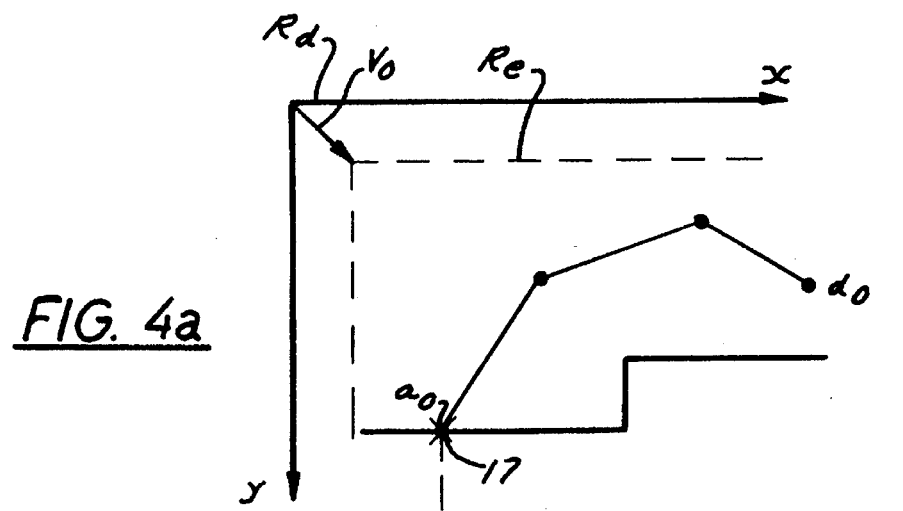
FIGS. 4a to 4d show simplified views of the servo-control effect of the invention by which the moving of the entity in the setting is synchronized.
Figure 4B:
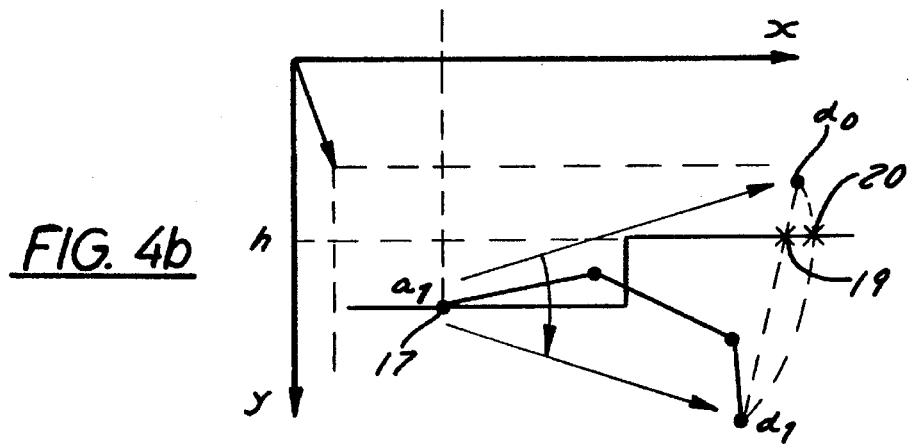
Figure 4C:
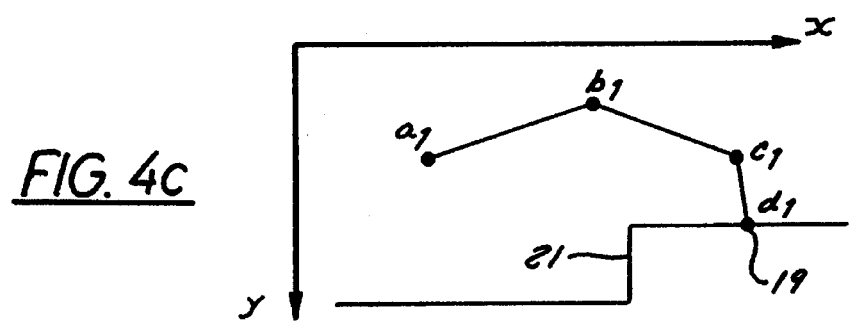

To constitute a second picture, such that the points a, b, c, and d of the character shown in FIG. 3a move from positions $a_0$, $b_0$, $c_0$, and $d_0$, shown in FIG. 3b (first posture), to occupy positions $a_1$, $b_1$, $c_1$, and $d_1$, depicted in FIG. 3c (second posture) the following procedure is used. To begin with (FIG. 4b), the second posture of the character, namely the one that is graphically represented in FIG. 3c, is taken into the same setting, namely that of FIG. 2b. A stepped reference or support surface for the character is shown in FIGS. 4a through 4c. It is then noted, by continuing to keep the characteristic point $a_0$–$a_1$ of the character as a pivot, that the extremity d of this character has gone to the other side of a reference surface that has to serve as a support. For example, in FIG. 4b, the point $a_1$ of the entity has been placed at the point 17. A position of the point $d_1$ is obtained with respect to this same state of the setting. Furthermore, the position of the point $d_0$ of the entity, as it was located in the first scene, has also been shown. Then, to simplify the explanation, the straight line $d_0$–$d_1$ is plotted, and it is observed that it cuts or intersects the reference surface at a point 19. As a variant, it is also possible to compute the intersection of the circle arc $d_0$–$d_1$, having a center 17, with the reference plane of the setting. As a variant, a more precise point 20 is obtained since, in practice, the movements of the characters are never translations (except when trains of entities are involved) but, on the contrary, most of the time they are rotations about pivots. These intersection computations can be done automatically by defining the plane or the surface of reference. More simply, with a ball or a mouse of the keyboard C, the animator can also indicate the intersection manually.

It is known then that $d_0$ has coordinates $X_0$, $Y_0$, $Z_0$ in the reference system Rd of the first setting and that d1 therein has coordinates $x_1$, $y_1$, $z_1$. $Z_0$ and $Z_1$ are not shown on the 2D representation of FIGS. 4a–4d. With h being known, h being the altitude in the setting in which it is sought to make the pivot d take support, it is possible to compute a coefficient $k=(h-Y_0)/(Y_{1-Y0})$. The method then consists in determining the coordinates x, y, z of the point 19 in the first setting such that $x=(1-k)x_0+kx_1$; $y=h$; and $z=(1-k)z_0+kz_1$.

The knowledge of h may be laid down in different ways. The value h may be dictated by the operator. It may be identical to the preceding value $Y_0$: the character then moves along a horizontal plane. Finally, it may be computed on the basis of knowledge of the form, generally a plane, of the reference on which the entity is supposed to move. For example, if the character is moving along uneven ground, the form of the reference may be like that depicted in FIGS. 4a through 4c (i.e. for example, a stepped plane representing uneven ground).

From this viewpoint, it must be noted that the setting may be devoid of any decorative element. All that is necessary with the invention, for this setting, is the definition of a reference, possibly not displayed, on which the entity is moving. Finally, the reference is not necessarily horizontal. It may be vertical or it may have another orientation if forces other than gravitational forces are involved.

In doing so, the presence of a new point of support 19 has been determined to be the intersection with the reference line shown in FIG. 4b in the setting. To obtain the picture of the second scene, there then remains to imposed, as a particular place 18 of the second state of the setting, the position 19 (or 20) thus found. The second posture $a_1$–$d_1$ is then made to get fixed in the second state of the setting in taking the point 19, previously found in the first state of the setting, as the point of support for this state of the setting (i.e. point 19 becomes the point of support for the second pivot point, $d_1$, of the character or entity). This is shown in FIG. 4c.

Figure 4D:
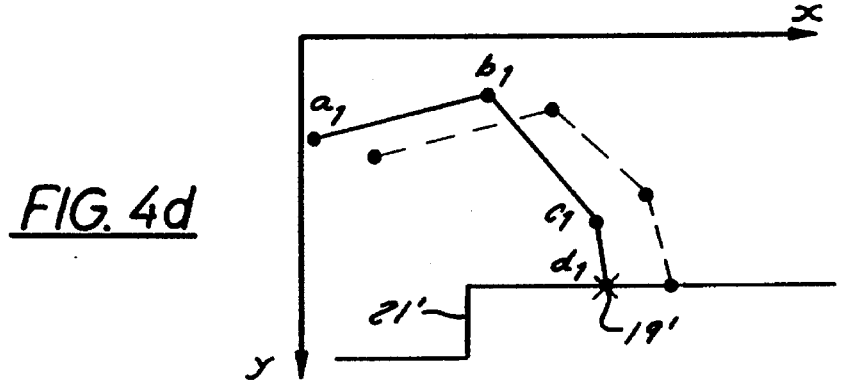

If the second setting is fixed, the state of the setting will be that of FIG. 4c. On the contrary, if the plane of display of the setting is not fixed, or if the state of the setting has been modified, it has a different state (FIG. 2c) from the one that it occupied previously in FIG. 2b. Under these conditions, the position of the pivot 19 is identified in relation to the reference of the first state of the setting and there is applied, for the second state of the setting, a translation equivalent to the shifts of the setting from a first state of this setting to this second state. This is shown in FIG. 4d where the character takes support of its extremity $d_1$ on a place 19' of the second state of the setting, which corresponds to the place 19 in the first state of the setting. For example, the distance between the location 19 of the first state of the setting and an irregular feature 21 of this setting in the first state of the setting is the same as between the place 19' and the representation 21' of this same irregular feature in the other state of the setting. All these translations are deduced from the changes of the viewpoint or speeds of shifting of the setting.

There are always two states of the setting. However, when the plane is fixed, the second state of the setting is exactly identical to the first one.

By way of a comparison, in FIG. 4d, dashed lines are used to show an arbitrary position that might have been chosen experimentally by an animator to place the entity in the second state of the setting. When the final pictures were displayed, it would have been necessary firstly to take account of what was wrong in the modified sequence and, secondly, to gradually modify the position of the pivot to make it ultimately occupy the position that is reached directly with the invention. With the invention, the processing is automatic instead of being done in piecemeal or manual fashion.

To determine a pivot, a search is made in the picture of the entity for the place, the part, and/or the extremity of the entity that is closest to a theoretical reference plane. For example, if the activity involved is that of walking, then the altitude of the lowest point of the character for a given posture will be determined (FIGS. 2a to 4d). In the posture of FIG. 3b, it is the point $a_0$; in the posture of FIG. 3c, it is the point $d_1$. In one improvement, when several points are involved, capable of fulfilling the role of a pivot (for example, a foot is not a physical point but a set of dots), the barycenter of the candidate dots is chosen. The candidate dots are, for example, those for which the altitude is the lowest within a range of given values.

Figure 5A:
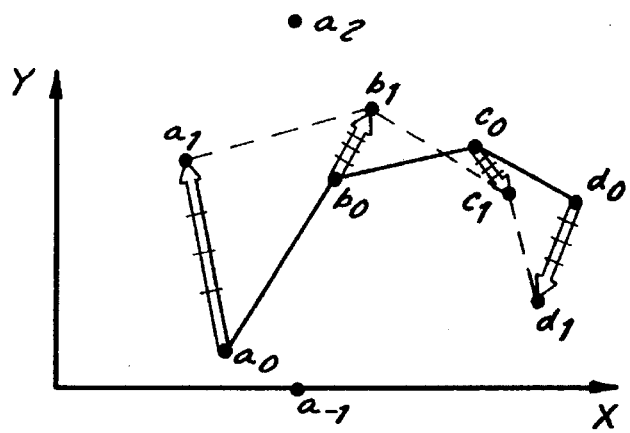
FIGS. 5a to 5c show an improvement to the technique for the computation of intermediate pictures.
Figure 5B:
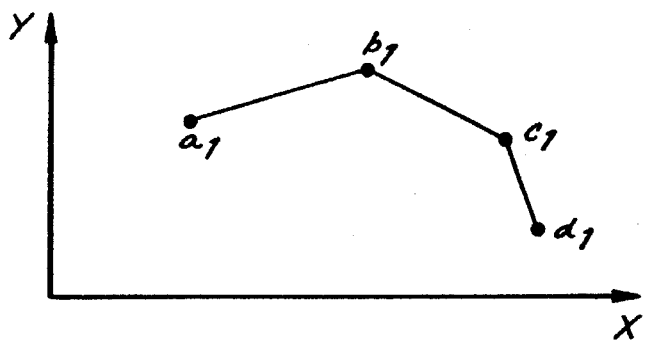

In practice, there are intermediate pictures obtained from key pictures. For example, in FIGS. 5a and 5b, it will be assumed that two preceding key positions have been represented: the position $a_0$–$d_0$ and, respectively, the position $a_1$–$d_1$. FIG. 5a even shows, in dashes, the second position. To go from one position to the other, the skeleton of the entity must occupy intermediate positions. Thus, on a straight line $a_0$–$a_1$, four intervals (time intervals) are shown, giving rise in all to five pictures: the two key pictures and three intermediate pictures.

The known interval-making techniques provide simply for dividing the distances $a_0$–$a_1$ by four (herein, since in the example four has been chosen) and for modifying the coordinates of the points a, b, c, d gradually by a quarter of the translation undergone.

In the invention, it has been realized that this technique results in a jerky character of the movements shown. To overcome this, more than two key positions ($a_0$–$a_1$) have been used to know the true intermediate positions of the characteristic points a–d of the skeleton of the entity. For example, for the point a, its key position $a_{-1}$ as well as its key position $a_2$ have been taken into account. It will be assumed, to simplify the explanation, that the number of pictures and hence the duration between the key pictures is the same from one key position to another.

Initially, a geometrical computation is made of the shape, in two dimensions or three dimensions as the case may be, of the curve connecting $a_{-1}$, $a_0$, $a_1$ and $a_2$. Many curves can be chosen to connect these points. Preferably, the curves chosen will be so-called BEZIER curves, as described in the document COMPUTER GRAPHICS, "Principles and Practice", Addison Wesley Publishing, 1990, USA, pp. 488 and ff.

Figure 5C:
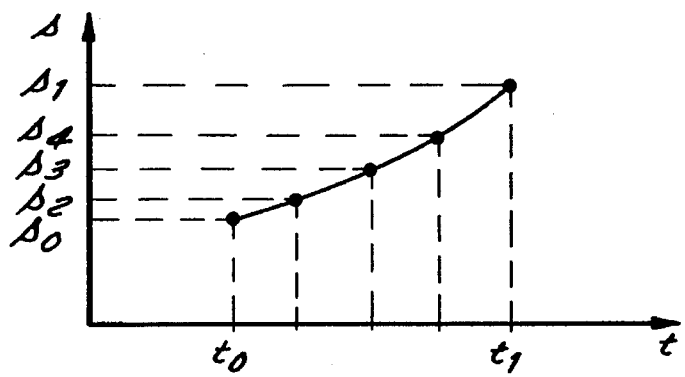

With these curves, to prepare the trajectories, essentially it is the tangents of these trajectories at the positions $a_0$ and $a_1$ that are taken into account. These tangents are generally oriented from $a_1$ towards $a_2$ and from $a_0$ towards $a_{-1}$, whence the usefulness of knowing these points. Once the curve of this trajectory has been obtained, its length is measured from $a_0$ to $a_1$, A schematic view has been shown in FIG. 5c of the development s of the length travelled as a function of time. This curve is not a straight line because it takes account of the accelerations and slowing down of a characteristic point. Then, the duration $t_0$–$t_1$ is divided into a useful number of intervals, in this case four intervals. The intermediate positions $S_2$, $S_3$ and $S_4$ are then determined between the positions $S_0$ and $S_1$. These positions are entered in the 3D trajectory of the point a. Then, the method determines, therefrom, the intermediate positions in space of the point a which corresponds to the intermediate instants at which the pictures have to be shown.

This interval-making method is appreciably less abrupt than the simplistic method of linear interpolation known up till now. It has the advantage of giving the characters motions that seem to be natural. This work is done normally for the main points of the skeleton, notably for those points a, b, c, d at whose position there are articulations in the entity. This is not necessary if the entity is rigid. If the entity is rigid, this work will be done only once.

Figure 6:
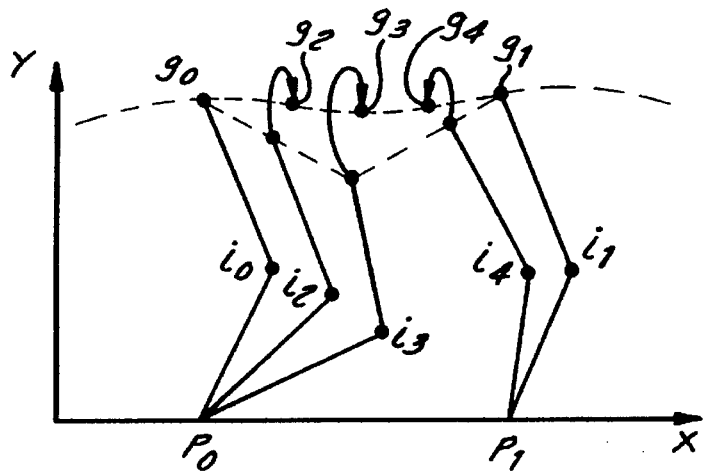
FIG. 6 shows the effects of the dampening of the shifts of the center of gravity.

FIG. 6 shows another improvement of the invention. To change from one posture to another, the entity moves in the setting with motions that may sometimes appear to be startling. For example, the character shown here above, who is tilting, takes support first of all with its foot at the position 17 FIGS. 2b & 4a and then with its hand at the position 18-19 (FIGS. 2c, 4b, & 4c). At the instant when it is tilting, the center of gravity of this character is unlikely to undergo sudden variations in its trajectory. This, however, is what could happen if we were to remain at this stage of automatic processing.

Thus, in the invention, during a first processing operation, scenes are created, the shifts of the entity or entities having been synchronized with respect to the setting and, possibly, for the intermediate pictures of a scene, in taking account of the speeds and accelerations of the characteristic points of entities. Once a sequence of scenes is obtained, the trajectory of the center of gravity of the entity is plotted. This center of gravity may, for example, be defined on an a priori basis as the middle of the cylinder 14 (FIG. 3a). From one key picture to the other, this center of gravity is then made to follow a smoothened curve which too, for example, is a BEZIER curve. Moreover, characteristic points are made to occupy a determined position in space. Notably, the position of the pivots is fixed. Then, a reverse kinematic algorithm is used, notably that of Michael GIRARD and A. A. MACIE-JEWSKI, "Computational Modelling For The Computer Animation Of Legged Figures" in the journal *Computer Graphics*, vol. 19, No. 3, July 1985. With this algorithm, starting from the center of gravity, it is possible to compute the intermediate articulation movements, given that the pivot points are now known and must be kept at the locations that have been computed for them. The compensation of inertia carried out in this way can be used to obtain pictures that are not jerky and that seem perfect to the human eye.

In practice, as shown in FIG. 6, the center of gravity g will occupy the positions $g_0$, $g_2$, $g_3$, $g_4$, $g_1$. Given the position of the pivot $P_0$ and $P_1$, the algorithm referred to will be used to make a deduction therefrom of the positions of an intermediate characteristic point i: $i_0$, $i_2$, $i_3$, $i_4$ and $i_1$. The curve $g_0$–$g_1$ is the BEZIER curve of the center of gravity.

What is claimed is:

1. In a computer having a first memory storage location for storing postures of a character or entity, a second memory storage location for storing states of a setting, a third memory storage location for storing scenes, and a display for showing scenes, wherein a posture of a character or entity is a particular orientation or positioning of that character or entity in space, a state of a setting is the view of a setting from a particular viewpoint, and a scene is created by combining a posture of a character with a state of a setting, a computer-assisted method for the creation of animated graphics, comprising:

(a) defining a character or entity for being animated;

(b) defining a setting in which the character or entity is to be animated and the setting having at least one reference, with each reference being one of a point, a surface, and a plane for supporting the character or entity;

(c) storing a first posture of the character or entity in the first memory storage location;

(d) storing a second posture of the character or entity in the first memory storage location;

(e) storing a first state of the setting in the second memory storage location;

(f) storing a second state of the setting in the second memory storage location;

(g) defining a first pivot on the character or entity;

(h) positioning the first posture of the character or entity in the first state of the setting such that the first pivot is supported by a reference of the setting;

(i) defining a second pivot on the character or entity;

(j) positioning the second posture of the character or entity in the first state of the setting with the first pivot supported by the reference of the setting and coincident with the position of the first pivot of the first posture;

(k) determining a point of intersection of the second pivot of the postures with a reference of the first state of the setting;

(l) locating the point of intersection of the second pivot on a reference of the second state of the setting; and (m) positioning the second posture of the character or entity in the second state of the setting such that the second pivot is supported by a reference at the intersection point.

2. The computer-assisted method for the creation of animated graphics according to claim 1 wherein in step (k) the intersection of the second pivot with the reference of the first state of the setting is determined manually.

3. The computer-assisted method for the creation of animated graphics according to claim 1 wherein in step (k) the intersection of the second pivot with the reference of the first state of the setting is determined where a line between the position of the second pivot on the first posture of the character and the position of the second pivot on the second posture of the character intersects the reference of the first state of the setting when both the first and second postures are positioned in the first state of the setting.

4. The computer-assisted method for the creation of animated graphics according to claim 1 wherein in step (k) the intersection of the second pivot with the reference of the first state of the setting is determined where an arc between the position of the second pivot on the first posture of the character and the position of the second pivot on the second posture of the character intersects the reference of the first state of the setting when both the first and second postures are positioned in the first state of the setting.

5. The computer-assisted method for the creation of animated graphics according to claim 1 wherein in step (k) the second pivot of the first posture of the character or entity in the first state of the setting is located at point $X_0, Y_0, Z_0$, in three-dimensional space, the second pivot of the second posture of the character or entity in the first state of the setting is located at point $X_1, Y_1, Z_1$, in three-dimensional space, the reference being located at an altitude, h, in the first state of the setting, and the point, x, y, z, in three-dimensional space of the intersection with the reference of the first state of the setting determined using the following equations:

(1) $k=(h-Y_0)/(Y_1-Y_0)$;

wherein k is a coefficient, and (2) $x=(1-k)X_0+kX_1$;

(3) $y=h$; and (4) $z=(1-k)Z_0+kZ_1$.

6. The computer-assisted method for the creation of animated graphics according to claim 1 wherein the second state of the setting is shifted from the first state of the setting and a translation is applied to the point of intersection determined in step (k) to accurately locate the point of intersection on the reference of the second state of the setting and wherein the translation applied is equivalent to the amount of the shift between the second state of the setting and the first state of the setting.

7. The computer-assisted method for the creation of animated graphics according to claim 1 wherein one of the pivots is determined by searching the posture of the entity or character for that portion of the entity or character that is closest to the reference of the setting.

8. The computer-assisted method for the creation of animated graphics according to claim 1, wherein to determine positions of the character or entity intermediate of the first and second postures over an interval of time required for movement of the character or entity from the first posture to the second posture, the steps further comprising:

(1) assigning a first key position ($a_{-1}$) and a second key position ($a_2$) to a state of a setting having both the first and second postures of the character or entity positioned therein;

(2) connecting (a) one of the key positions, (b) a first pivot on one of the postures of the entity or character, (c) a first pivot on the other of the postures of the entity or character, and (d) the other of the key positions by a curve;

(3) measuring the length of the curve from the first posture of one of the characters or entities to the first pivot of the other of the characters or entities;

(4) graphically or numerically representing the curve determined in step (3) relative to the interval of time;

(4) dividing the interval of time into a useful number of intermediate time intervals;

(5) determining the length of the curve for each of the intermediate time intervals;

(6) determining the intermediate positions of the first pivot for each intermediate time interval using the length of the curve between each time interval as a reference for moving the first pivot in the amount of the length of the curve; and (7) plotting each intermediate position.

9. The computer-assisted method for the creation of animated graphics according to claim 8 wherein the curve is a bezier curve.

10. The computer-assisted method for the creation of animated graphics according to claim 1 further comprising:

(1) determining a center of gravity of the character or entity; and (2) utilizing a reverse kinematic algorithm along with the center of gravity of the character or entity to determine intermediate articulation movements of the character or entity.

* * * * *